(12) United States Patent
Seong et al.

(10) Patent No.: US 12,354,808 B2
(45) Date of Patent: Jul. 8, 2025

(54) MULTILAYER ELECTRONIC COMPONENT

(71) Applicant: SAMSUNG ELECTRO-MECHANICS CO., LTD., Suwon-si (KR)

(72) Inventors: Kwang Dong Seong, Suwon-si (KR); Young Ah Song, Suwon-si (KR); Bong Gyu Choi, Suwon-si (KR); Do Kyeong Lee, Suwon-si (KR); Jae Hoon Bang, Suwon-si (KR); Wan Sik Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 284 days.

(21) Appl. No.: 18/210,936

(22) Filed: Jun. 16, 2023

(65) Prior Publication Data

US 2024/0296996 A1 Sep. 5, 2024

(30) Foreign Application Priority Data

Mar. 2, 2023 (KR) .......................... 10-2023-0027755

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC ............... *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC ...... H01G 4/008; H01G 4/012; H01G 4/2325; H01G 4/30
See application file for complete search history.

(56) References Cited

U.S. PATENT DOCUMENTS

| | | | |
|---|---|---|---|
| 2014/0146437 A1* | 5/2014 | Lee ...................... | H01G 4/2325 361/301.4 |
| 2015/0014900 A1 | 1/2015 | Lee et al. | |
| 2016/0104578 A1 | 4/2016 | Kang et al. | |
| 2021/0366654 A1* | 11/2021 | Iguchi ................... | H01G 4/1218 |
| 2022/0293343 A1* | 9/2022 | Iguchi ................... | H01G 4/302 |
| 2023/0034900 A1* | 2/2023 | Iguchi ................... | H01G 4/1227 |

FOREIGN PATENT DOCUMENTS

| | | |
|---|---|---|
| KR | 10-1444613 B1 | 9/2014 |
| KR | 10-2016-0042609 A | 4/2016 |

* cited by examiner

*Primary Examiner* — Nathan Milakovich
(74) *Attorney, Agent, or Firm* — Morgan Lewis & Bockius LLP (57) ABSTRACT

A multilayer electronic component includes a body including a dielectric layer and an internal electrode; and an external electrode disposed on the body and connected to the internal electrode, wherein the external electrode includes a conductive metal and glass, and wherein at least a portion of the glass includes a secondary phase of the glass including barium (Ba), aluminum (Al), and silicon (Si).

20 Claims, 7 Drawing Sheets

MULTILAYER ELECTRONIC COMPONENT

CROSS-REFERENCE TO RELATED APPLICATION(S)

This application claims the benefit of priority to Korean Patent Application No. 10-2023-0027755 filed on Mar. 2, 2023 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip condenser mounted on the printed circuit boards of various types of electronic products such as image display devices including a liquid crystal display (LCD), a plasma display panel (PDP), or the like, a computer, a smartphone, a mobile phone, or the like, serving to charge or discharge electricity.

Such a multilayer ceramic capacitor may be used as a component of various electronic devices, as the multilayer ceramic capacitor has a small size and high capacitance thereof and is easily mounted. As various electronic devices such as computers, mobile devices, or the like have been miniaturized and high-output, demand for miniaturization and high capacitance multilayer ceramic capacitors has been increased.

To achieve miniaturization and high capacitance of the multilayer ceramic capacitor, thinning of an external electrode is also in progress along with thinning of an internal electrode or a dielectric layer. However, when a thin external electrode is formed with a conventional external electrode paste, a difference in surface roughness increases due to a large size of a conductive metal particle, which may cause a problem in that electrode coverage is deteriorated during sintering. In addition, a glass component may be added to improve bonding strength between an external electrode and a body. The glass component may realize high density on a surface of the external electrode, but may be vulnerable to corrosion in a plating solution, and may be partially damaged due to an acid plating solution during a plating process. As a result, the internal electrode may be exposed externally in a chip to which the thin external electrode is applied, or plating may be broken due to delamination of the external electrode, resulting in poor moisture resistance reliability.

(Patent Document 1) Korean Patent Publication No. 10-2016-0042609

(Patent Document 2) Korean Patent Registration No. 10-1444613

SUMMARY

One of various problems to be solved by the present disclosure is to improve reliability of a multilayer electronic component.

One of various problems to be solved by the present disclosure is to improve a density of an external electrode.

One of various problems to be solved by the present disclosure is to prevent erosion of an external electrode due to a plating solution.

One of various problems to be solved by the present disclosure is to improve moisture resistance reliability due to external moisture permeation.

One of various problems to be solved by the present disclosure is to prevent a glass pooling phenomenon on a surface of an external electrode.

However, various problems to be solved by the present disclosure are not limited to the above, and will be more easily understood in the process of describing specific embodiments of the present disclosure.

According to an aspect of the present disclosure, a multilayer electronic component includes a body including a dielectric layer and an internal electrode; and an external electrode disposed on the body and connected to the internal electrode, wherein the external electrode includes a conductive metal and glass, and wherein at least a portion of the glass includes a secondary phase of the glass including barium (Ba), aluminum (Al), and silicon (Si).

BRIEF DESCRIPTION OF DRAWINGS

The above and other aspects, features, and advantages of the present disclosure will be more clearly understood from the following detailed description, taken in conjunction with the accompanying drawings, in which.

Portion a-1 of FIG. 11 is an image of an outer surface of an external electrode of a comparative example, captured by a scanning electron microscope (SEM), and portions a-2 to a-5 of FIG. 11 are images of specific elements in portion a-1 of FIG. 11, mapped by an electron particle microscopy analyzer (EPMA). Portion b-1 of FIG. 11 is an image of an outer surface of an external electrode of an inventive example, captured by a scanning electron microscope (SEM), and portions b-2 to b-5 of FIG. 11 are images of specific elements in portion b-1 of FIG. 11, mapped by an electron particle microscopy analyzer (EPMA).

DETAILED DESCRIPTION

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes, sizes, and the like, of the elements in the drawings may be exaggerated for clarity of description, and the elements denoted by the same reference numerals in the drawings may be the same elements.

In addition, in order to clearly explain the present disclosure in the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stacking direction or a thickness T direction, a second direction may be defined as a length L direction, and a third direction may be defined as a width W direction.

Multilayer Electronic Component

Figure 1:
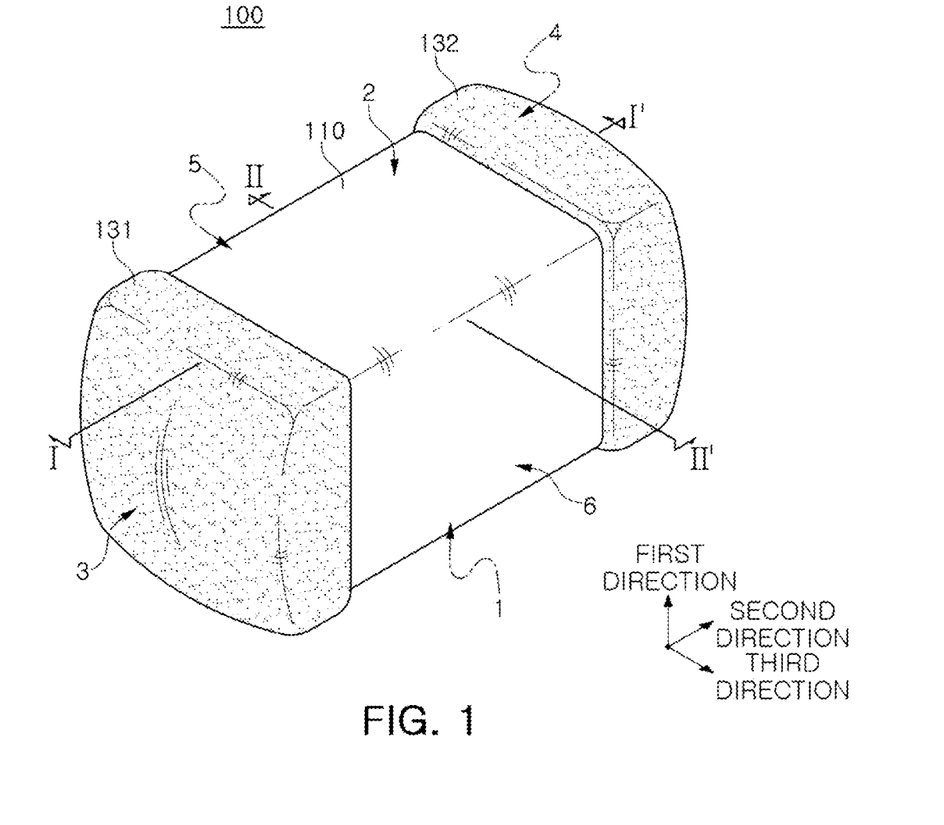
FIG. 1 schematically illustrates a perspective view of a multilayer electronic component according to an embodiment of the present disclosure.

FIG. 1 schematically illustrates a perspective view of a multilayer electronic component according to an embodiment of the present disclosure.

Figure 2:
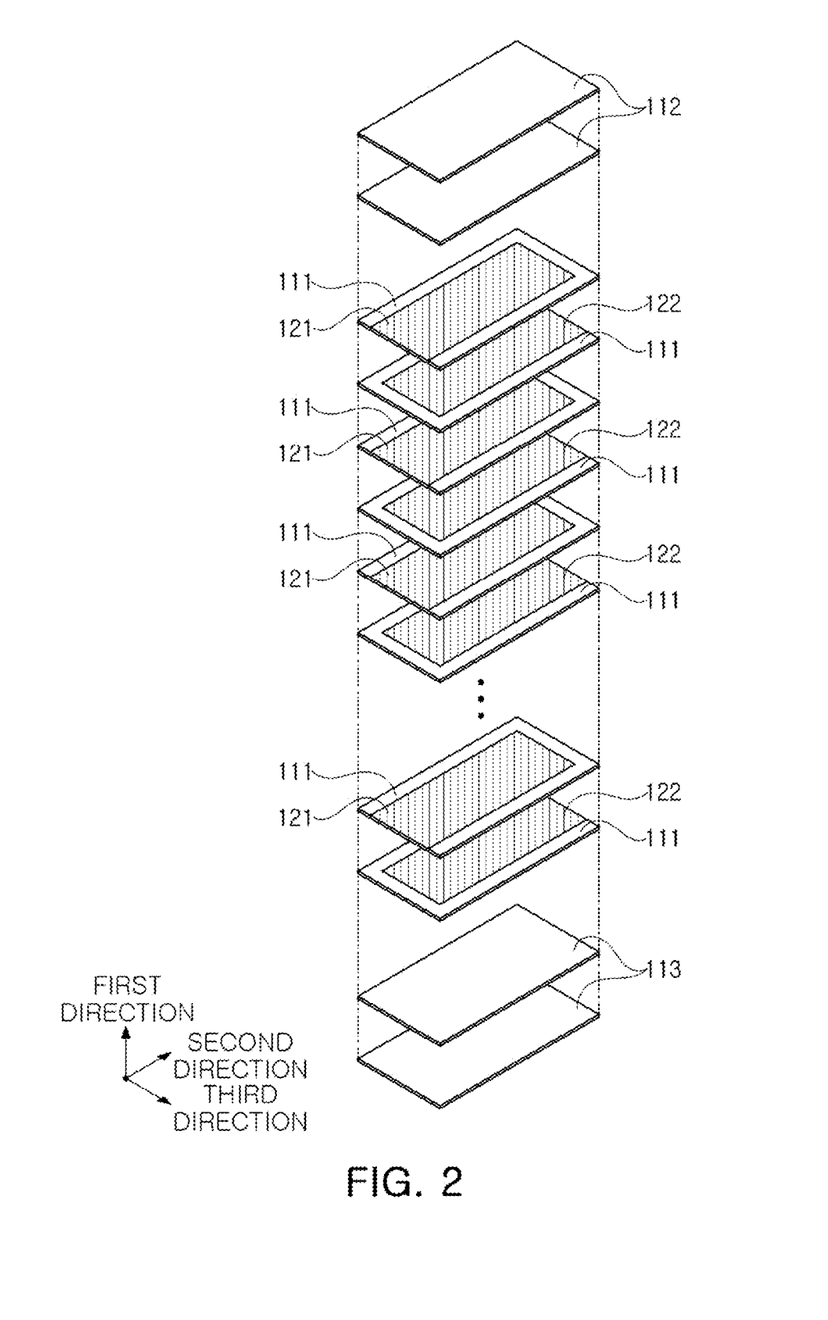
FIG. 2 is an exploded perspective view of a stacked structure of an internal electrode.

FIG. 2 is an exploded perspective view of a stacked structure of an internal electrode.

Figure 3:
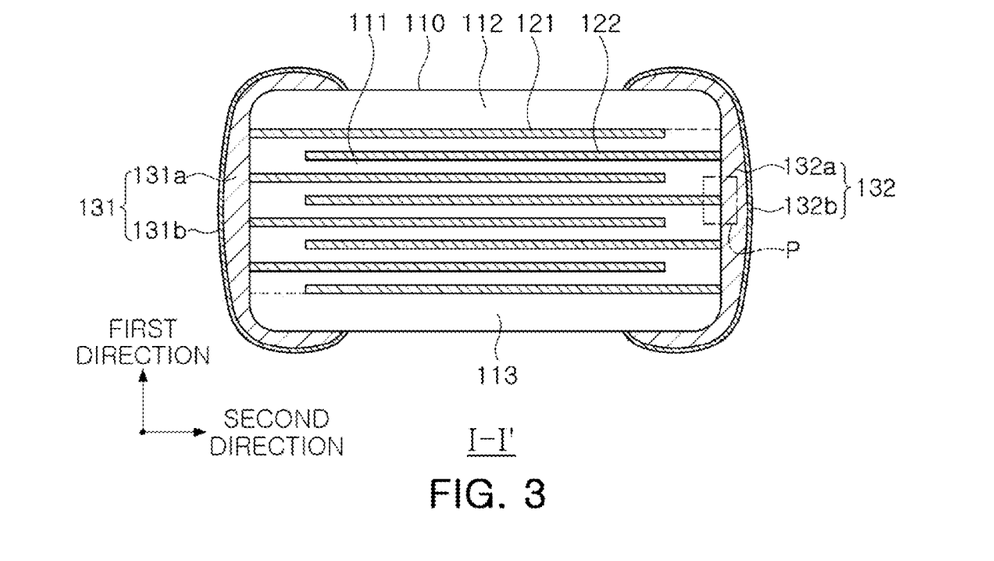
FIG. 3 schematically illustrates a cross-sectional view of FIG. 1, taken along line I-I'.

FIG. 3 schematically illustrates a cross-sectional view of FIG. 1, taken along line I-I'.

Figure 4:
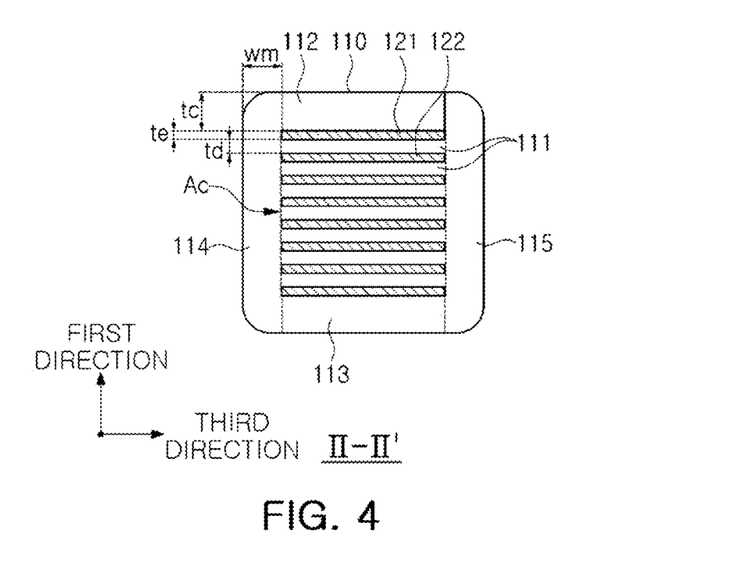
FIG. 4 schematically illustrates a cross-sectional view of FIG. 1, taken along line II-II'.

FIG. 4 schematically illustrates a cross-sectional view of FIG. 1, taken along line II-II'.

Figure 5:
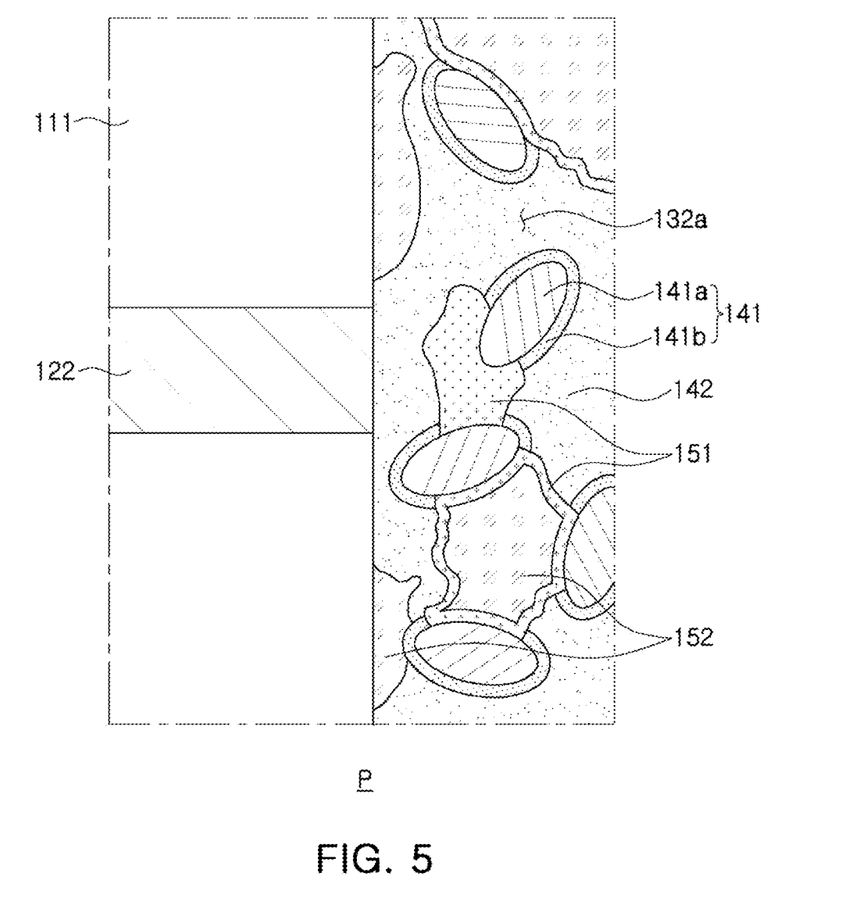
FIG. 5 schematically illustrates an enlarged view of portion P of FIG. 3.

FIG. 5 schematically illustrates an enlarged view of portion P of FIG. 3.

Figure 6:
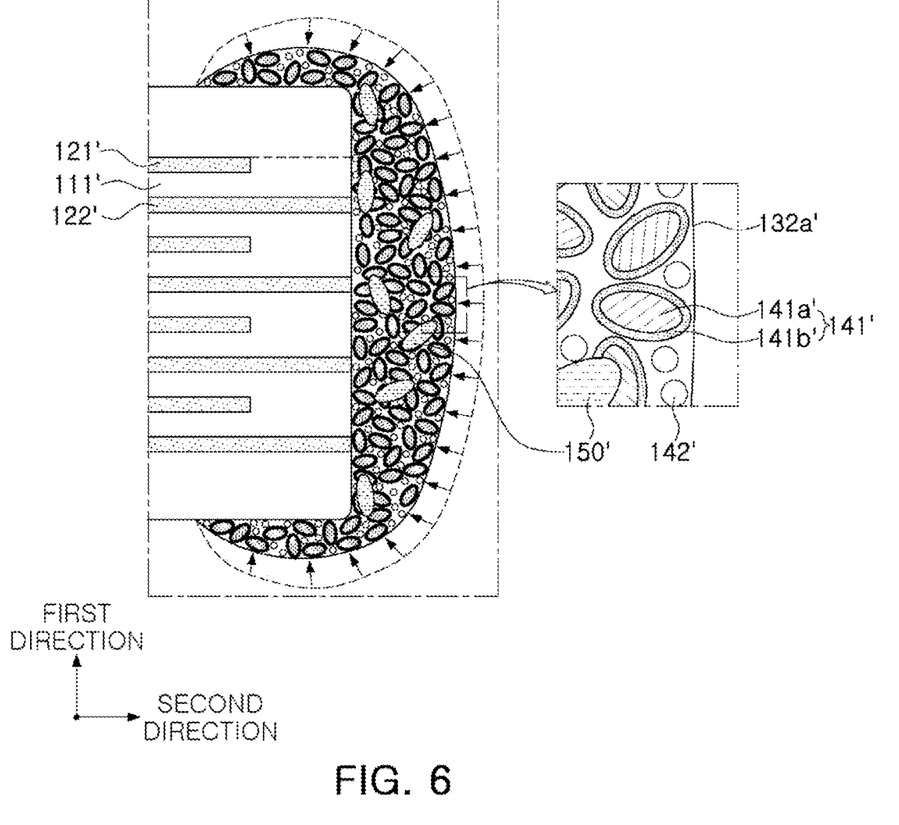
FIG. 6 schematically illustrates a sintering process of an external electrode.

FIG. 6 schematically illustrates a sintering process of an external electrode.

Hereinafter, a multilayer electronic component according to an example embodiment of the present disclosure will be described in detail with reference to FIGS. 1 to 6. A multilayer ceramic capacitor will be described as an example of a multilayer electronic component, but the example embodiment may also be applied to various electronic products using a dielectric composition, such as an inductor, a piezoelectric element, a varistor, a thermistor, or the like.

A multilayer electronic component 100 according to an embodiment of the present disclosure may include a body 110 including a dielectric layer 111 and an internal electrode (121 and 122); and an external electrode (131 and 132) disposed on the body 110 and connected to the internal electrode (121 and 122), wherein the external electrode (131 and 132) includes a conductive metal and glass, and wherein at least a portion of the glass includes a secondary phase of the glass including barium (Ba), aluminum (Al), and silicon (Si).

In the body 110, the dielectric layer 111 and the internal electrode (121 and 122) may be alternately stacked.

More specifically, the body 110 may be disposed in the body 110, and may include a first internal electrode 121 and a second internal electrode 122, alternately disposed to face each other, with the dielectric layer 111 interposed therebetween, to include a capacitance forming unit Ac that forms capacitance.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

A plurality of dielectric layers 111 forming the body 110 may be in a sintered state, and a boundary between adjacent dielectric layers 111 may be integrated to such an extent that it may be difficult to identify the same without using a scanning electron microscope (SEM).

A raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), $Ba(Ti_{1-y} Zr_y)O_3$ ($0<y<1$), or the like, in which calcium (Ca), zirconium (Zr), or the like is partially dissolved in $BaTiO_3$, or the like.

In addition, various ceramic additives, organic solvents, binders, dispersants, or the like may be added to the powder of barium titanate ($BaTiO_3$), and the like, as the raw material for forming the dielectric layer 111.

A thickness td of the dielectric layer 111 does not need to be particularly limited.

To more easily achieve miniaturization and high capacitance of the multilayer electronic component, the thickness td of the dielectric layer 111 may be 0.6 μm or less, more preferably 0.4 μm or less.

In this case, the thickness td of the dielectric layer 111 may mean the thickness td of the dielectric layer 111 disposed between the first and second internal electrodes 121 and 122.

The thickness td of the dielectric layer 111 may mean a size of the dielectric layer 111 in the first direction. Also, the thickness td of the dielectric layer 111 may mean an average thickness td of the dielectric layer 111, and may mean an average size of the dielectric layer 111 in the first direction.

The average size of the dielectric layer 111 in the first direction may be measured by scanning images of cross-sections of the body 110 in the first and second directions with a scanning electron microscope (SEM) at a magnification of 10,000. More specifically, the average size of one dielectric layer 111 in the first direction means an average value calculated by measuring a size of one dielectric layer 111 in the second direction at thirty (30) equally spaced points in the scanned image in the first direction. The thirty (30) equally spaced points may be designated in the capacitance forming unit Ac. In addition, when such an average value is determined by extensively using measurements of average values to ten (10) dielectric layers 111, the average size of the dielectric layers 111 in the first direction may be further generalized.

The internal electrodes (121 and 122) may be alternately stacked with the dielectric layer 111.

The internal electrodes (121 and 122) may include the first internal electrode 121 and the second internal electrode 122, and the first and second internal electrodes 121 and 122 may be alternately disposed to oppose each other with the dielectric layers 111, constituting the body 110, interposed therebetween, and may be exposed from the third and fourth surfaces 3 and 4 of the body 110, respectively.

More specifically, the first internal electrode 121 may be spaced apart from the fourth surface 4, and may be exposed from the third surface 3, and the second internal electrode 122 may be spaced apart from the third surface 3, and may be exposed from the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

For example, the first internal electrode 121 is not connected to the second external electrode 132, but is connected to the first external electrode 131, and the second internal electrode 122 is not connected to the first external electrode 131, but is connected to the second external electrode 132. In this case, the first and second internal electrodes 121 and 122 are electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed, and then sintering the alternately stacked ceramic green sheets.

A material for forming the internal electrodes (121 and 122) is not particularly limited, and a material having excellent electrical conductivity may be used. For example, the internal electrodes (121 and 122) may include nickel (Ni), copper (Cu), palladium (Pd), silver (Ag), gold (Au), platinum (Pt), tin (Sn), tungsten (W), titanium (Ti), and alloys thereof.

In addition, the internal electrodes (121 and 122) may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of providing the conductive paste for the internal electrodes, a screen-printing method, a gravure printing method, or the like may be used, but the present disclosure is not limited thereto.

A thickness te of the internal electrodes (121 and 122) does not need to be particularly limited.

To more easily achieve miniaturization and high capacitance of the multilayer electronic component, the thickness of the internal electrodes (121 and 122) may be 0.6 μm or less, more preferably 0.4 μm or less.

In this case, the thickness te of the internal electrodes (121 and 122) may mean a size of the internal electrodes (121 and 122) in the first direction. In addition, the thickness te of the internal electrodes (121 and 122) may mean an average thickness te of the internal electrodes (121 and 122), and may mean an average size of the internal electrodes (121 and 122) in the first direction.

The average size of the internal electrodes (121 and 122) in the first direction may be measured by scanning images of cross-sections of the body 110 in the first and second directions with a scanning electron microscope (SEM) at a magnification of 10,000. More specifically, the average size of one internal electrode in the first direction may be an average value calculated by measuring a size of one internal electrode in the second direction at thirty (30) equally spaced points in the scanned image. The thirty (30) equally spaced points may be designated in the capacitance forming unit Ac. In addition, when such an average value is determined by extensively using measurements of average values to ten (10) internal electrodes (121 and 122), the average size of the internal electrodes (121 and 122) in the first direction may be further generalized.

The body 110 may include cover portions 112 and 113 disposed on both end-surfaces of the capacitance forming unit Ac in the first direction.

More specifically, the cover portions 112 and 113 may include an upper cover portion 112 disposed above the capacitance forming unit Ac in the first direction, and a lower cover portion 113 disposed below the capacitance forming unit Ac in the first direction.

The upper cover portion 112 and the lower cover portion 113 may be formed by stacking a single dielectric layer 111 or two or more dielectric layers 111 on upper and lower surfaces of the capacitance forming portion Ac in the first direction, respectively, and may basically play a role in preventing damage to the internal electrodes (121 and 122) due to physical or chemical stress.

The upper cover portion 112 and the lower cover portion 113 may not include the internal electrode (121 and 122), and may include the same material as the dielectric layer 111. For example, the upper cover portion 112 and the lower cover portion 113 may include a ceramic material, and may include, for example, a barium titanate ($BaTiO_3$)-based ceramic material.

A thickness tc of each of the cover portions 112 and 113 does not need to be particularly limited.

To more easily achieve miniaturization and high capacitance of the multilayer electronic component, the thickness tc of each of the cover portions 112 and 113 may be 100 μm or less, preferably 30 μm or less, and, in case of ultra-small products, more preferably 20 μm or less.

In this case, the thickness tc of each of the cover portions 112 and 113 may mean a size of each of the cover portions 112 and 113 in the first direction. In addition, the thickness tc of each of the cover portions 112 and 113 may mean an average thickness tc of each of the cover portions 112 and 113, and may mean an average size of each of the cover portions 112 and 113 in the first direction.

The average size of each of the cover portions 112 and 113 in the first direction may be measured by scanning images of cross-sections of the body 110 in the first and second directions with a scanning electron microscope (SEM) at a magnification of 10,000. More specifically, the average size may be an average value calculated by measuring the size in the first direction at 30 equally spaced points in the second direction in the scanned image of one cover portion.

In addition, the average size of the cover portion in the first direction measured by the above-described method may be substantially the same as the average size of the cover portion in the first direction, in cross-sections of the body 110 in the first and third directions.

The first and second side margin portions 114 and 115 may be disposed on both end-surfaces of the body 110 in the third direction.

More specifically, the first and second side margin portions 114 and 115 may include a first side margin portion 114 disposed on the fifth surface 5 of the body 110, and a second side margin portion 115 disposed on the sixth surface 6 of the body 110. For example, the first and second side margin portions 114 and 115 may be disposed on both end-surfaces of the body 110 in the third direction.

As illustrated, the first and second side margin portions 114 and 115 may refer to regions between both ends of the body 110 in the first and third directions and a boundary surface of the body 110, in a cross-section of the body 110 cut in the first and third directions.

The first and second side margin portions 114 and 115 may play a role in preventing damage to the internal electrodes (121 and 122) due to physical or chemical stress.

The first and second side margin portions 114 and 115 may be prepared by applying a conductive paste on a ceramic green sheet to form the internal electrodes (121 and 122), except for a portion in which the first and second side margin portions 114 and 115 are formed, and, to suppress a step difference due to the internal electrode (121 and 122), cutting the internal electrodes (121 and 122) to expose the fifth and sixth surfaces 5 and 6 of the body 110, and then stacking a single dielectric layer 111 or two or more dielectric layers 111 in the third direction on both end-surfaces of the capacitance forming portion Ac in the third direction.

The first side margin portion 114 and the second side margin portion 115 may not include the internal electrode (121 and 122), and may include the same material as the dielectric layer 111. For example, the first side margin portion 114 and the second side margin portion 115 may include a ceramic material, and may include, for example, a barium titanate ($BaTiO_3$)-based ceramic material.

A width wm of each of the first and second side margin portions 114 and 115 does not need to be particularly limited.

To more easily achieve miniaturization and high capacitance of the multilayer electronic component 100, the width wm of each of the first and second side margin portions 114 and 115 may be 100 μm or less, and preferably 30 μm or less, and, in case of ultra-small products, more preferably 20 μm or less.

In this case, the width wm of each of the first and second side margin portions 114 and 115 may mean a size of each of the first and second side margin portions 114 and 115 in the third direction. Also, the width wm of each of the first and second side margin portions 114 and 115 may mean an average width wm of each of the first and second side margin portions 114 and 115, and may mean an average size of each of the first and second side margin portions 114 and 115 in the third direction.

The average size of each of the first and second side margin portions 114 and 115 in the third direction may be measured by scanning images of cross-sections of the body 110 in the first and third directions with a scanning electron microscope (SEM) at a magnification of 10,000. More specifically, the average size may refer to an average value calculated by measuring sizes in the third direction at ten (10) equally spaced points in the first direction in a scanned image of one side margin.

In an embodiment of the present disclosure, a structure in which the multilayer electronic component 100 has two external electrodes (131 and 132) is illustrated, but the number, shapes, or the like of the external electrodes (131 and 132) may be changed, depending on a shape of the internal electrodes (121 and 122), or other purposes.

The external electrodes (131 and 132) may be disposed on the body 110 and connected to the internal electrodes (121 and 122).

More specifically, the external electrodes (131 and 132) may include first and second external electrodes 131 and 132 disposed on the third and fourth surfaces 3 and 4 of the body 110, respectively, and may be connected to the first and second internal electrodes 121 and 122, respectively. For example, the first external electrode 131 may be disposed on the third surface 3 of the body, and may be connected to the first internal electrode 121, and the second external electrode 132 may be disposed on the fourth surface 4 of the body, and may be connected to the second internal electrode 122.

The external electrodes (131 and 132) may be formed of any material as long as they have electrical conductivity, such as metal or the like, and a specific material may be determined in consideration of electrical characteristics, structural stability, or the like, and may further have a multilayer structure.

For example, the external electrodes (131 and 132) may include electrode layers 131a and 132a disposed on the body 110, and plating layers 131b and 132b disposed on the electrode layers 131a and 132a.

As a more specific example of the electrode layers 131a and 132a, the electrode layers 131a and 132a may be sintered electrodes including a conductive metal and glass or resin-based electrodes including a conductive metal and a resin.

In addition, the electrode layers 131a and 132a may have a form in which a sintered electrode and a resin-based electrode are sequentially formed on the body 110.

In addition, the electrode layers 131a and 132a may be formed by transferring a sheet containing the conductive metal onto the body 110, or may be formed by transferring a sheet containing the conductive metal onto a sintered electrode.

As the conductive metal used for the electrode layers 131a and 132a, a material that may be electrically connected to the internal electrodes (121 and 122) to form capacitance may be used, but is not particularly limited thereto. For example, the conductive metal may include one or more of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste prepared by adding glass frit to a conductive metal powder and then sintering the same.

To achieve miniaturization and high capacitance of the multilayer ceramic capacitor, thinning of the external electrode is also in progress along with thinning of the internal electrodes or the dielectric layers. However, when a thin external electrode is formed with a conventional external electrode paste, a difference in surface roughness increases due to a large size of a conductive metal particle, which may cause a problem in that electrode coverage is deteriorated during sintering. A glass component may be added to improve bonding strength between the external electrode and the body. The glass component may realize a high density on a surface of the external electrode, but may be vulnerable to corrosion resistance in a plating solution, and may be partially damaged due to an acid plating solution during a plating process. As a result, the internal electrode may be exposed externally in a chip to which the thin external electrode is applied, or plating may be broken due to delamination of the external electrode, resulting in poor moisture resistance reliability.

To solve this problem, research is being conducted to reduce the surface roughness through atomization of conductive metal powder (particles) used in an external electrode, and to offset the side effects that may occur due to use of fine particles, a method of delaying a sintering start temperature by forming a sintering delay coating layer on a surface of conductive metal particles, or the like may be used.

Currently, glass mainly used for an external electrode may be formed of materials that may be weak in corrosion resistance to a plating solution, but may be advantageous in realizing a high surface density. In a conventional thick external electrode, even when portion of the glass is eroded, an electrode layer of the external electrode may be thick, and therefore, no major problem may occur during a plating process. Problems such as glass exposed from a surface being easily eroded and a passage through which plating solution or external moisture may permeate into the body, and the like, may occur.

Therefore, in an embodiment of the present disclosure, an external electrode may include a conductive metal and glass, and at least a portion of the glass may include a secondary phase of the glass including barium (Ba), aluminum (Al), and silicon (Si). Therefore, there may be effects of improving densification of a thin external electrode, plating corrosion resistance, and moisture resistance reliability.

More specifically, glass 152 included in the external electrodes (131 and 132) may improve density of the external electrodes (131 and 132), and a secondary phase 151 of the glass including barium (Ba), aluminum (Al), and silicon (Si) may improve corrosion resistance and moisture resistance reliability.

The secondary phase of the glass including barium (Ba), aluminum (Al), and silicon (Si) may have excellent corrosion resistance. Therefore, since the glass may not be eroded by a plating solution even in a thin external electrode, reliability may be excellent.

The secondary phase of the glass including barium (Ba), aluminum (Al), and silicon (Si) may be, for example, represented by a chemical formula of $BaAl_2Si_2O_8$, but is not particularly limited thereto.

When the secondary phase 151 of the glass is included, there may be an effect of preventing a glass pooling phenomenon on a surface of the external electrodes (131 and 132).

As the glass is eluted during a sintering process, pores may be formed inside or outside (on the surface) of the external electrodes (131 and 132), but due to a sintering delay effect of a coating layer described later, while the secondary phase 151 of the glass is formed, the glass may fill the pores inside the external electrodes (131 and 132) again. Therefore, a glass pooling phenomenon may not occur.

The glass pooling phenomenon may be accompanied by formation of pores inside the external electrode, and there may be a concern that surface roughness is deteriorated.

When the coating layer is not formed, internal densification of the external electrode may proceed rapidly due to rapid sintering of the conductive metal, and the glass pooling phenomenon may occur on the surface of the external electrodes (131 and 132) due to an elution phenomenon of the glass.

A method of confirming the secondary phase of the glass, for example, $BaAl_2Si_2O_8$, may use X-ray diffraction (XRD) on the surface of the external electrode of a sintered chip, to determine through detection of peaks corresponding to $BaAl_2Si_2O_8$, but may not be particularly limited thereto.

As an alternative method, after observing the surface of the external electrode of the sintered chip by a scanning electron microscope (SEM), it may be confirmed by mapping specific elements by an electron particle microscopy analyzer (EPMA).

Comparative examples and inventive examples may be described as follows by way of example.

Figure 11:
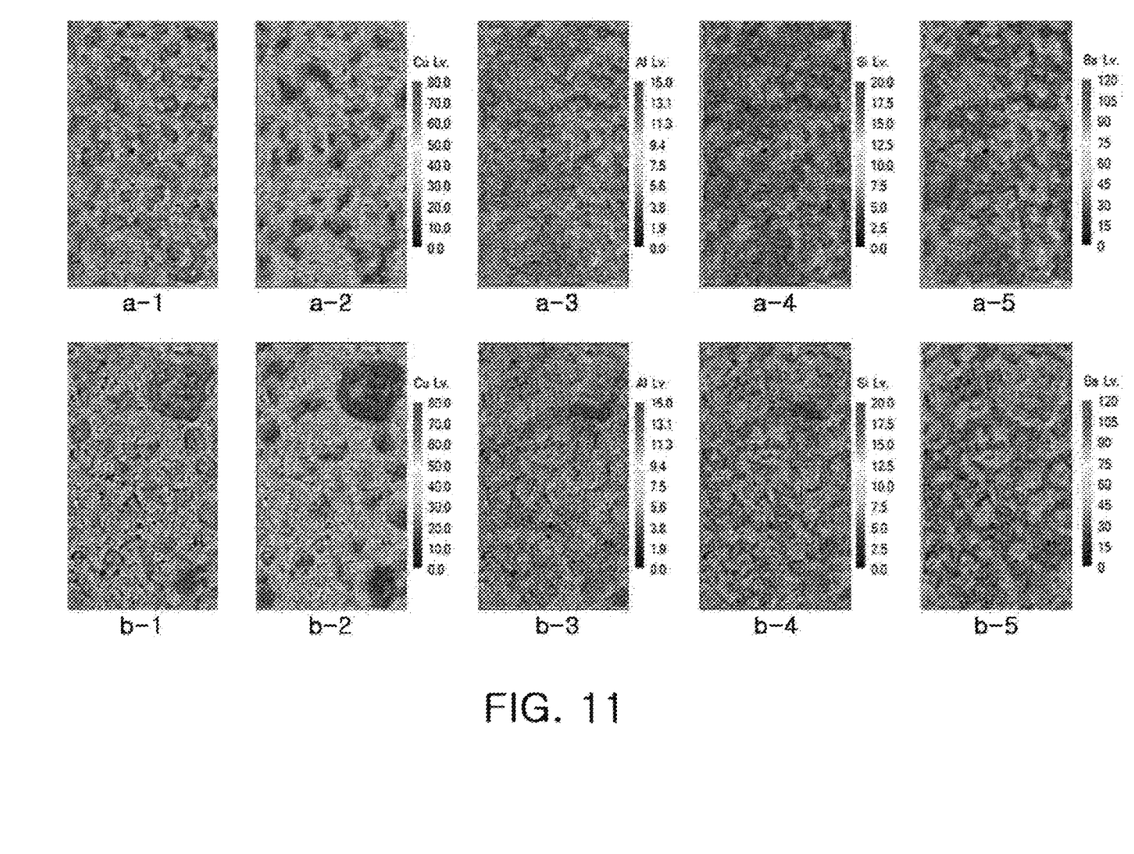

Portion a-1 of FIG. 11 is an image of an outer surface of an external electrode of a comparative example, captured by a scanning electron microscope (SEM), at a magnification of 5000 times, and portions a-2 to a-5 of FIG. 11 are images of specific elements in portion a-1 of FIG. 11, mapped by an electron particle microscopy analyzer (EPMA) Portion a-2 of FIG. 11 is a mapped image of a copper (Cu) element, portion a-3 of FIG. 11 is a mapped image of an aluminum (Al) element, portion a-4 of FIG. 11 is a mapped image of a silicon (Si) element, and portion a-5 of FIG. 11 is a mapped image of a barium (Ba) element.

Portion b-1 of FIG. 11 is an image of an outer surface of an external electrode of an inventive example, captured by a scanning electron microscope (SEM), at a magnification of 5000 times, and portions b-2 to b-5 of FIG. 11 are images of specific elements in portion b-1 of FIG. 11, mapped by an electron particle microscopy analyzer (EPMA) Portion b-2 of FIG. 11 is a mapped image of a copper (Cu) element, portion b-3 of FIG. 11 is a mapped image of an aluminum (Al) element, portion b-4 of FIG. 11 is a mapped image of a silicon (Si) element, and portion b-5 of FIG. 11 is a mapped image of a barium (Ba) element.

A region in which a barium (Ba) element is mapped may correspond to a region containing glass, and, among regions in which barium (Ba) is observed, a region in which a relatively high amount of aluminum (Al) is mapped may be a region in which a secondary phase is formed, and it can be seen that a region in which a relatively high amount of silicon (Si) is observed may be a region in which a secondary phase of glass is formed.

In portions a-1 to a-5 of FIG. 11, which are comparative examples, it can be confirmed that silicon (portion a-4 of FIG. 11) is hardly observed in a region in which barium (portion a-5 of FIG. 11) and aluminum (portion a-3 of FIG. 11) are simultaneously observed. In portions b-1 to b-5 of FIG. 11, which are inventive examples, it can be confirmed that a high amount of silicon (portion b-4 of FIG. 11) is observed in a region in which barium (portion b-5 of FIG. 11) and aluminum (portion b-3 of FIG. 11) are simultaneously observed. From this, it can be seen that the secondary phase of the glass was formed in inventive examples, whereas the secondary phase of the glass was not formed in comparative examples.

In this case, qualitative/quantitative measurement of an average amount of elements may be performed by measuring and averaging three (3) points among regions in which barium (Ba), aluminum (Al), and silicon (Si) are simultaneously observed, to acquire an average amount of elements included in a corresponding region.

In this case, the secondary phase of the glass may have an average amount of silicon (Si) in a range from 5 at % to 20 at %, among aluminum (Al), silicon (Si), barium (Ba), and zinc (Zn) elements, constituting the glass.

When the average amount of silicon (Si) is in a range from 5 at % to 20 at %, density, corrosion resistance, and moisture resistance reliability of the external electrode may be improved.

When the average amount of silicon (Si) is less than at %, corrosion resistance, and moisture resistance reliability may be deteriorated. When the average amount of silicon (Si)

exceeds 20 at %, there may be a risk that pores are formed to deteriorate corrosion resistance, and moisture resistance reliability.

In addition, an area fraction of silicon (Si) in the secondary phase of the glass disposed on an outer surface of the external electrodes (131 and 132) may be in a range from 60% to 100%.

When the area fraction of silicon (Si) in the secondary phase of the glass disposed on the outer surface of the external electrodes (131 and 132) is in a range from 60% to 100%, density, corrosion resistance, and moisture resistance reliability of the external electrode may be improved.

When the area fraction of silicon (Si) in the secondary phase of the glass is less than 60%, corrosion resistance and moisture resistance reliability of the external electrode may be deteriorated.

FIG. 5 schematically illustrates an enlarged view of portion P of FIG. 3, which may be a final product state after sintering, and FIG. 6 schematically illustrates a sintering process of an external electrode. FIG. 6 illustrates a sintering process of a second external electrode 132 disposed on a fourth surface 4 of a body, but may also be similarly applied to a sintering process of a first external electrode 131 disposed on a third surface 3 of the body. Hereinafter, a process of forming a secondary phase of glass will be described with reference to FIG. 6, but is not particularly limited thereto.

A paste of the external electrode may include conductive metals 141' and 142' and a glass frit 150'. The conductive metals 141' and 142' may include spherical particles 142' and flake-shaped particles 141', and the flake-shaped particles 141' may include a conductive metal 141a' therein, and a coating layer 141b' including aluminum (Al) and silicon (Si) surrounding at least a portion of the conductive metal 141a', respectively.

In addition, the glass frit 150' may include, for example, a barium-zinc (Ba—Zn)-based glass frit 150'.

During the sintering process, in the Ba—Zn-based glass frit 150', softening may proceed at a relatively low temperature of about 650° C. to form glass 152, to improve densification of the external electrode. In addition, the Ba—Zn-based glass frit 150' may react with the coating layer 141b' including Al and Si at a relatively high temperature of about 730° C. to form a secondary phase 151 of the glass, to improve corrosion resistance and moisture resistance reliability of the external electrode.

The external electrodes (131 and 132) may include a secondary phase 151 of glass having corrosion resistance of an aluminosilicate system due to a change in mole fraction of an element in the glass. In addition, the external electrodes (131 and 132) may include a conductive metal 141 including a coating layer 141b that does not react with glass, may include glass 152 that does not react with the coating layer but in which the glass frit has softened, and may include a conductive region 142.

For example, the Ba—Zn-based glass frit 150' may be changed during the sintering process to a region of the glass 152 capable of improving density while being softened, and to a region of the secondary phase 151 of the glass capable of improving corrosion resistance and moisture resistance reliability.

The paste of the external electrodes (131 and 132) may shrink during the sintering process, as illustrated in the drawings, and the region of the glass 152 capable of improving density, and the region of the secondary phase 151 of the glass capable of improving corrosion resistance and moisture resistance reliability, may be included to improve density, corrosion resistance, and moisture resistance reliability of the external electrodes (131 and 132).

In an embodiment of the present disclosure, although not illustrated in the drawings, at least a portion of a surface of the glass may be surrounded by the secondary phase of the glass, and an entire surface of the glass may be surrounded by the secondary phase of the glass. However, the present disclosure is not particularly limited thereto, and a secondary phase of the glass may also be included inside the glass.

The Ba—Zn-based glass frit may have a low melting point and excellent wettability with a conductive metal, to improve density of the external electrode. In this case, on the surface of the glass, more specifically, on an interface contacting the flake-shaped conductive metal including the coating layer, fractions of Al and Si on the surface of the glass may increase during the sintering process due to the coating layer, and finally, the secondary phase of the glass may be formed only on the surface of the glass. In this case, only at least a portion of the surface of the glass may be changed into the secondary phase of the glass to surround the glass, and the secondary phase of the glass may surround the entire surface of the glass. In addition, the secondary phase of the glass may surround the glass, not in the interface contacting the conductive metal, but in a region exposed externally, in the glass.

When Al—Si-based glass having high fractions of Al and Si is used, a melting point of the glass may increase and wettability thereof with the conductive metal may be reduced, to deteriorate density. In addition, since the glass has high fractions of Al and Si as a whole, a secondary phase of the glass may be formed not only on the interface of the glass but also inside the glass, and due to resulting shrinkage of the glass, pores may be formed inside or on the surface of the external electrode. For example, to improve corrosion resistance, when only a mole fraction of aluminosilicate of the glass component increases, a problem may occur in improving density of the Ba—Zn-based glass.

In an embodiment of the present disclosure, an average thickness of an electrode layers (131a and 132a) may be in a range from 1 μm to 20 μm, and more specifically, an average thickness of a first electrode layer 131a and an average thickness of a second electrode layer 132a may be in a range from 1 μm to 20 μm, respectively.

As the secondary phase 151 of the glass is formed, effects of improving corrosion resistance and moisture resistance reliability may be more excellent even for thin external electrodes (131 and 132).

When the average thickness of each of the electrode layers 131a and 132a is in a range from 1 μm to 20 μm, density, corrosion resistance, and moisture resistance reliability of the external electrodes may be improved, and relatively thin external electrodes (131 and 132) may be achieved.

When the average thickness of each of the electrode layers 131a and 132a is less than 1 μm, the body may be exposed to the outside or the secondary phase of the glass may not be sufficiently formed, to deteriorate corrosion resistance, and moisture resistance reliability. When the average thickness of each of the electrode layers 131a and 132a exceeds 20 μm, it may be difficult to achieve the desired thinness for the external electrodes (131 and 132).

The average thickness of each of the electrode layers 131a and 132a may mean an average thickness of a region contacting internal electrodes (121 and 122), and may mean an average thickness measured at five (5) equally spaced points among regions contacting the internal electrodes (121 and 122).

More specifically, the first electrode layer 131a may be electrically connected to the first internal electrode 121 on the third surface 3 of the body, and may be disposed on the third surface 3 of the body. In this case, a size of the first electrode layer 131a disposed on the third surface 3 of the body in the second direction may be defined as a thickness of the first electrode layer 131a, and a value obtained by averaging sizes of the first electrode layers 131a in the second direction measured at four (4) equally spaced points in the first direction, starting from a size of the first electrode layer 131a in the second direction, measured at a center point of the body 110 in the first direction, may be defined as an average thickness of the first electrode layer 131a. In this case, a position of the first electrode layer 131a in the first direction for measuring the second direction may be set to an outermost layer of the internal electrodes (121 and 122) in the first direction. For example, a region (an extension line in the second direction) that does not exceed the first and second internal electrodes 121 and 122 disposed on the outermost layer in the first direction may be limited to a position in which a size of the first electrode layer 131a in the second direction may be measured. An average thickness of the second electrode layer 132a may be measured in the same manner as the above-described method.

According to an embodiment of the present disclosure, the body 110 may not be exposed externally in a region of the external electrodes (131 and 132) in which the internal electrodes (121 and 122) may be connected to the external electrodes (131 and 132).

More specifically, the third surface 3 of the body 110 may be completely covered by the first external electrode 131 without being exposed externally, and the fourth surface 4 of the body 110 may be completely covered by the second external electrode 132 without being exposed externally.

In this case, "completely covered by external electrodes" does not mean that the external electrode (131 and 132) is 100% filled with a material included in the external electrodes (131 and 132) without pores, but may mean that there is no passage in the external electrodes (131 and 132) connecting the third surface 3 or the fourth surface 4 of the body to the outside, by the external electrodes (131 and 132).

This may be caused by a result of the secondary phase 151 of the glass being included in the external electrodes (131 and 132), and as a result, since the body 110 may not be exposed externally, moisture resistance reliability may be excellent.

Density of the external electrodes (131 and 132) according to an embodiment of the present disclosure may be 85% or more, preferably 90% or more, and more preferably 92% or more. The term "density" here refers to a fraction of area of a given external electrode that does not have pores. Thus, for example, the if the total area of the external electrode is 100 units, and pores occupy 15 units out of the 100 units, the density of such an external electrode is 85%.

When density of the external electrodes (131 and 132) is less than 85%, corrosion resistance and moisture resistance reliability may be deteriorated.

A plating layers (131b and 132b) may serve to improve mounting characteristics.

A type of the plating layer may not be particularly limited, and may be provided as a single plating layer 131b or 132b containing at least one of nickel (Ni), tin (Sn), palladium (Pd), or an alloy thereof, and may be formed as a plurality of layers.

For a more specific example of the plating layers (131b and 132b), the plating layers (131b and 132b) may be an Ni plating layer or an Sn plating layer, and the Ni plating layer and the Sn plating layer may be sequentially formed on the electrode layers (131a and 132a). There may be a form in which the Sn plating layer, the Ni plating layer, and the Sn plating layer may be sequentially formed. In addition, the plating layers (131b and 132b) may include a plurality of Ni plating layers and/or a plurality of Sn plating layers.

A plating solution forming the plating layer may be an acidic solution, which may erode glass included in typical electrode layers. When the glass is eroded, the body may be exposed externally to deteriorate reliability such as moisture resistance reliability or the like.

When the secondary phase 151 of the glass is included in the external electrode (131 and 132), erosion of the glass by the plating solution may be prevented. Therefore, the body 110 may not be exposed externally.

A size of the multilayer electronic component 100 is not particularly limited.

Effects according to the present disclosure may be superior in processes of achieving miniaturization and high capacitance of the multilayer electronic component 100, for example, may be excellent than in a size of 1005 (length×width: 1.0 mm×0.5 mm) or less.

Although embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

Hereinafter, the present disclosure will be described in more detail through examples, but this may be to facilitate a detailed understanding of the present disclosure, and the scope of the present disclosure is not limited by the examples.

Example

Hereinafter, density evaluation results of comparative examples 1 to 4 and inventive examples 1 to 4, which may be sample chips, will be described.

Each of the sample chips used a size of 1005 (length×width: 1.0 mm×0.5 mm), and after loading horizontally, was molded with epoxy, was polished using sand paper/diamond suspension, and observation thereof was started using a scanning electron microscope (SEM). After immersing a portion in which an external electrode was formed in a plating solution at 60° C. for 10 minutes, a cross-section thereof was observed using a scanning electron microscope (SEM) to check whether glass was eroded, to evaluate corrosion resistance and density.

To evaluate corrosion resistance and density, in comparative example 1, copper (Cu) powder particles and Ba—Zn-based glass were mixed without forming a coating layer including Al and Si in an external electrode paste, and then applied to an outside of a chip, to form an external electrode that does not contain a secondary phase of glass.

Figure 7A:
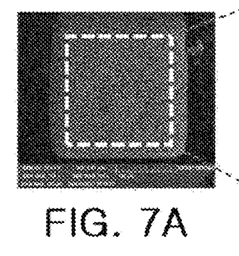
FIG. 7A is an image of an external electrode of a comparative example, captured by a scanning electron microscope (SEM)
Figure 7B:
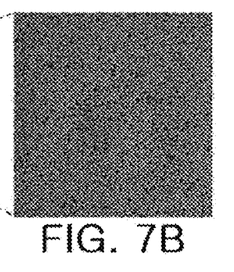
FIG. 7B is an enlarged image obtained by enlarging a dotted line region of FIG. 7A.
Figure 7C:
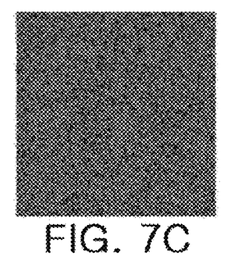
FIG. 7C is a converted image of FIG. 7B for density evaluation.

FIG. 7A is an image of an external electrode of comparative example 1, captured by a scanning electron microscope (SEM), FIG. 7B is an enlarged image obtained by enlarging a dotted line region of FIG. 7A, and FIG. 7C is a converted image of FIG. 7B for density evaluation.

As a result of measuring density thereof, which was a percentage value for a region excluding a black region represented by dots, compared to an image region in FIG. 7C through the program, it was measured as 81.2%.

Although not illustrated in the drawings, densities of external electrodes of comparative examples 2 to 4, prepared in the same manner as comparative example 1, were measured to be 79.2%, 74.8%, and 75.6%, respectively.

In inventive example 1, a coating layer containing Al and Si was mixed with flake-shaped copper (Cu) powder particles and Ba—Zn-based glass in an external electrode paste, and then applied to an outside of a chip, to form an external electrode including a secondary phase of glass. Other configurations were manufactured in the same manner as in comparative example 1.

Figure 8A:
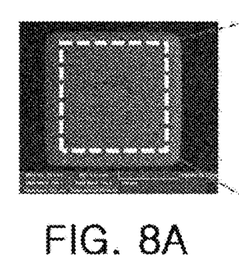
FIG. 8A is an image of an external electrode of an inventive example, captured by a scanning electron microscope (SEM)
Figure 8B:
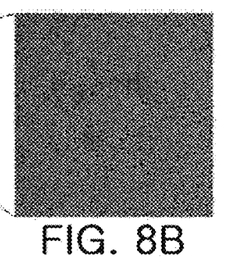
FIG. 8B is an enlarged image obtained by enlarging a dotted line region of FIG. 8A.
Figure 8C:
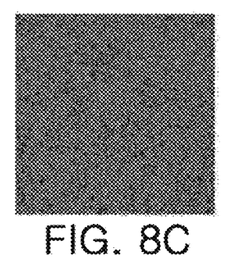
FIG. 8C is a converted image of FIG. 8B for density evaluation.

FIG. 8A is an image of an external electrode of inventive example 1, captured by a scanning electron microscope (SEM), FIG. 8B is an enlarged image obtained by enlarging a dotted line region of FIG. 8A, and FIG. 8C is a converted image of FIG. 8B for density evaluation.

As a result of measuring density thereof in the same manner as in comparative example 1, it was measured as 92.7%.

Although not illustrated in the drawings, densities of external electrodes of inventive examples 2 to 4 were measured to be 90.2%, 90.9%, and 90.4%, respectively.

From this, it can be seen that density of an external electrode including a secondary phase of glass was superior to density of an external electrode not including a secondary phase of glass. From this, it can be seen that corrosion resistance and moisture resistance reliability were improved.

Next, comparative example 5 in which an external electrode was formed in the same manner as in comparative example 1 and inventive example 5 in which an external electrode was formed in the same manner as in inventive example 1 will be described.

Figure 9A:
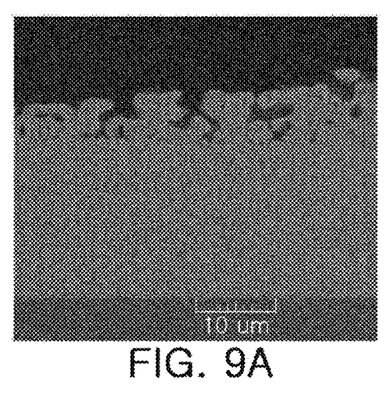
FIG. 9A is an image of a cross-section of a central portion of an external electrode of a comparative example, captured by a scanning electron microscope (SEM)
Figure 9B:
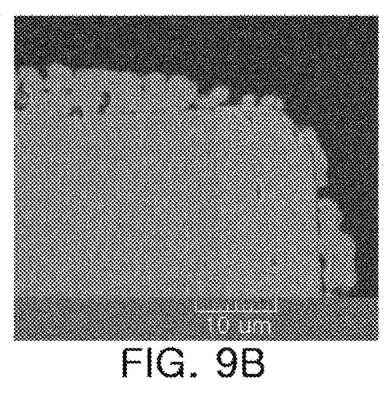
FIG. 9B is an image of a cross-section of a corner of an external electrode of a comparative example, captured by a scanning electron microscope (SEM).

FIG. 9A is an image of a cross-section of a central portion of an external electrode of comparative example 5, captured by a scanning electron microscope (SEM), and FIG. 9B is an image of a cross-section of a corner of an external electrode of comparative example 5, captured by a scanning electron microscope (SEM).

As can be seen in FIG. 9A, it can be seen that a body, more specifically, a surface of the body from which an internal electrode was exposed was exposed externally due to a channel formed in an external electrode. Therefore, it can be seen that moisture resistance reliability was inferior. In addition, as can be seen in portion FIG. 9B, it can be seen that the body was exposed externally due to poor coverage of a corner of the external electrode, and it may be expected that external moisture may penetrate due to the exposed portion of the body.

Figure 10A:
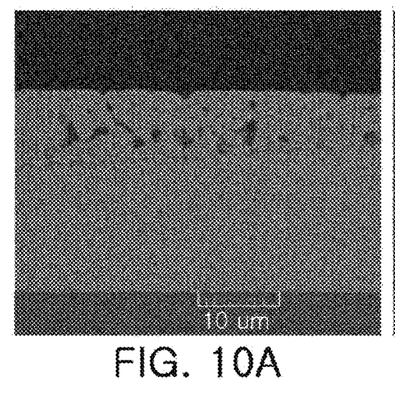
FIG. 10A is an image of a cross-section of a central portion of an external electrode of an inventive example, captured by a scanning electron microscope (SEM)
Figure 10B:
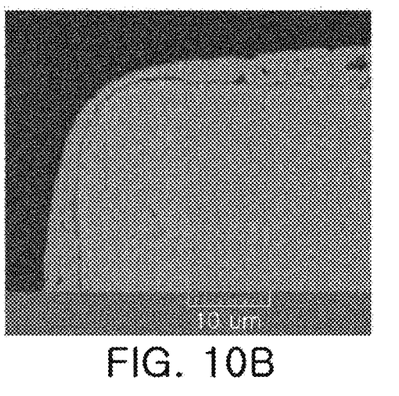
FIG. 10B is an image of a cross-section of a corner of an external electrode of an inventive example, captured by a scanning electron microscope (SEM).

FIG. 10A is an image of a cross-section of a central portion of an external electrode of inventive example 5, captured by a scanning electron microscope (SEM), and FIG. 10B is an image of a cross-section of a corner of an external electrode of inventive example 5, captured by a scanning electron microscope (SEM).

As can be seen in FIG. 10A, it can be seen that a body, more specifically, a surface of the body from which an internal electrode was exposed was not exposed externally, and as can be seen in FIG. 10B, it can be seen that the body was not exposed externally, since coverage of a corner of the external electrode was excellent, From this, it may be expected that since the body was not exposed externally, and a path through which external moisture passes was blocked, moisture resistance reliability was excellent.

The expression 'an embodiment' used in this specification does not mean the same embodiment, and may be provided to emphasize and describe different unique characteristics. However, an embodiment presented above may not be excluded from being implemented in combination with features of another embodiment. For example, although the description in a specific embodiment is not described in another example, it can be understood as an explanation related to another example, unless otherwise described or contradicted by the other embodiment.

The terms used in this disclosure are used only to illustrate various examples and are not intended to limit the present inventive concept. Singular expressions include plural expressions unless the context clearly dictates otherwise.

One of various effects of the present disclosure is to improve reliability of a multilayer electronic component.

One of various effects of the present disclosure is to improve a density of an external electrode.

One of various effects of the present disclosure is to improve corrosion resistance of an external electrode.

One of various effects of the present disclosure is to improve moisture resistance reliability of a multilayer electronic component.

One of various effects of the present disclosure is to suppress a glass pooling phenomenon on a surface of an external electrode.

Various advantages and effects of the present disclosure are not limited to the above description, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and an internal electrode; and
an external electrode disposed on the body and connected to the internal electrode,
wherein the external electrode includes a conductive metal and glass, and
wherein at least a portion of the glass includes a secondary phase including barium (Ba), aluminum (Al), and silicon (Si).

2. The multilayer electronic component of claim 1, wherein the secondary phase comprises $BaAl_2Si_2O_8$.

3. The multilayer electronic component of claim 1, wherein at least a portion of a surface of the glass is surrounded by the secondary phase.

4. The multilayer electronic component of claim 3, wherein an entire surface of the glass is surrounded by the secondary phase.

5. The multilayer electronic component of claim 1, wherein the secondary phase has an average amount of silicon (Si) of in a range from 5 at % to 20 at %, among aluminum (Al), silicon (Si), barium (Ba), and zinc (Zn) elements including the glass.

6. The multilayer electronic component of claim 1, wherein an area fraction of silicon (Si) in the secondary phase disposed on an outer surface of the external electrode is in a range from 60% to 100%.

7. The multilayer electronic component of claim 1, wherein the external electrode comprises an electrode layer including the conductive metal and the glass, and a plating layer disposed on the electrode layer.

8. The multilayer electronic component of claim 7, wherein an average thickness of the electrode layer is in a range from 1 μm to 20 μm.

9. The multilayer electronic component of claim 1, wherein a density of the external electrode is 85% or more.

10. The multilayer electronic component of claim 1, wherein a region of the external electrode to which the internal electrode is connected is not exposed externally.

11. The multilayer electronic component of claim 1, wherein the conductive metal has a flake shape.

12. The multilayer electronic component of claim 11, wherein at least a portion of the conductive metal having the flake shape comprises a coating layer including aluminum (Al) and silicon (Si).

13. The multilayer electronic component of claim 1, wherein the conductive metal comprises copper (Cu).

14. The multilayer electronic component of claim 1, wherein the dielectric layer comprises a plurality of dielectric layers, and an average thickness of at least one of the plurality of dielectric layers is 0.4 μm or less.

15. The multilayer electronic component of claim 1, wherein the internal electrode comprises a plurality of internal electrodes, and an average thickness of at least one of the plurality of internal electrodes is 0.4 μm or less.

16. The multilayer electronic component of claim 1, having a size of 1005 (length×width: 1.0 mm×0.5 mm) or less.

17. An external electrode for an electronic component, comprising an electrode layer including:
  a conductive metal; and
  glass comprising a secondary phase including barium (Ba), aluminum (Al), and silicon (Si),
  wherein the secondary phase surrounds at least a portion of a surface of the glass.

18. The external electrode of claim 17, further comprising a plating layer disposed on the electrode layer, wherein the electrode layer is disposed between a body of the multilayer ceramic capacitor and the plating layer.

19. The external electrode of claim 17, wherein the secondary phase has an area fraction of silicon in a range from 60% to 100%.

20. The external electrode of claim 17, wherein an average thickness of the electrode layer is in a range from 1 μm to 20 μm.

* * * * *